(12) United States Patent
Goossen

(10) Patent No.: US 7,658,346 B2
(45) Date of Patent: Feb. 9, 2010

(54) DOUBLE DUCTED HOVERING AIR-VEHICLE

(75) Inventor: Emray R. Goossen, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 412 days.

(21) Appl. No.: 11/338,558

(22) Filed: Jan. 24, 2006

(65) Prior Publication Data

US 2006/0192047 A1 Aug. 31, 2006

Related U.S. Application Data

(60) Provisional application No. 60/656,811, filed on Feb. 25, 2005.

(51) Int. Cl.
*B64C 27/08* (2006.01)
(52) U.S. Cl. .................. 244/17.23; 244/53 R; 244/54; 244/17.11; 244/17.25
(58) Field of Classification Search ............... 244/4 R, 244/53 R, 54, 17.11, 17.23, 17.25
See application file for complete search history.

(56) References Cited

U.S. PATENT DOCUMENTS

| | | | | |
|---|---|---|---|---|
| 2,037,745 | A | * | 4/1936 | Vaughn .................. 244/17.19 |
| 2,417,896 | A | * | 3/1947 | Zimmerman ............. 244/17.15 |
| 2,997,258 | A | * | 8/1961 | Purpura .................... 244/23 R |
| 3,023,980 | A | | 3/1962 | Martin et al. |
| 3,393,882 | A | * | 7/1968 | Soulez-Lariviere et al. . 244/231 |
| 3,768,757 | A | * | 10/1973 | Eickmann ................ 244/17.23 |
| 3,972,490 | A | * | 8/1976 | Zimmermann et al. ..... 244/12.3 |
| 4,071,206 | A | * | 1/1978 | Magill ..................... 244/17.11 |
| 4,982,914 | A | | 1/1991 | Eickmann et al. |
| 5,086,993 | A | | 2/1992 | Wainfan et al. |
| 5,145,129 | A | | 9/1992 | Gebhard |
| 5,150,857 | A | | 9/1992 | Moffitt et al. |
| 5,170,963 | A | * | 12/1992 | Beck, Jr. ..................... 244/12.2 |

(Continued)

FOREIGN PATENT DOCUMENTS

DE 4302791 A1 8/1994

(Continued)

OTHER PUBLICATIONS

PCT International Search.

*Primary Examiner*—Michael R Mansen
*Assistant Examiner*—Philip J Bonzell
(74) *Attorney, Agent, or Firm*—Shumaker & Sieffert, P.A.

(57) ABSTRACT

A dual ducted fan arrangement in which the duct components, engine, and avionics/payload pods are capable of being quickly disassembled to fit within common backpacking systems. Each duct is identical in fan, stator, and control vane design. Assembly connections between ducted fans and electronic modules are also identical. An engine or APU drives the dual ducted fans through a splined shaft to a differential or through electric motors. Energy is transferred to the ducted fans by a single gear mounted to the stator hub. Relative speeds of the individual ducted fans are controlled through separate frictional or generator load control braking mechanisms on each of the splined shafts between the differential and ducted fans. In the electric motor case relative speed is through electronic speed control. The fans are counter rotating for torque balancing. The electronic module locations are vertically variable for longitudinal center of gravity for variations in payloads.

15 Claims, 17 Drawing Sheets

U.S. PATENT DOCUMENTS

| | | | |
|---|---|---|---|
| 5,226,350 A | 7/1993 | Cycon et al. | |
| 5,277,380 A | 1/1994 | Cycon et al. | |
| 5,297,759 A * | 3/1994 | Tilbor et al. | 244/17.11 |
| 5,351,913 A | 10/1994 | Cycon et al. | |
| 5,372,337 A | 12/1994 | Kress et al. | |
| 5,407,150 A | 4/1995 | Sadleir | |
| 5,419,513 A | 5/1995 | Flemming, Jr. et al. | |
| 5,575,438 A | 11/1996 | McGonigle et al. | |
| 5,779,188 A * | 7/1998 | Frick | 244/4 A |
| 5,863,013 A | 1/1999 | Schmittle | |
| 5,890,441 A * | 4/1999 | Swinson et al. | 244/12.3 |
| 5,941,478 A | 8/1999 | Schmittle | |
| 6,065,718 A | 5/2000 | Piasecki | |
| 6,170,778 B1 | 1/2001 | Cycon et al. | |
| 6,270,038 B1 | 8/2001 | Cycon et al. | |
| 6,488,232 B2 * | 12/2002 | Moshier | 244/4 A |
| 6,502,787 B1 | 1/2003 | Barrett | |
| 6,607,162 B2 | 8/2003 | Warsop et al. | |
| 6,655,631 B2 | 12/2003 | Austen-Brown | |
| 6,672,538 B2 | 1/2004 | Milleau et al. | |
| 6,691,949 B2 | 2/2004 | Plump et al. | |
| 2002/0003188 A1 | 1/2002 | Moshier | |
| 2002/0113165 A1 * | 8/2002 | Moshier | 244/4 A |

FOREIGN PATENT DOCUMENTS

WO PCT/US2006/004478     9/2006

\* cited by examiner

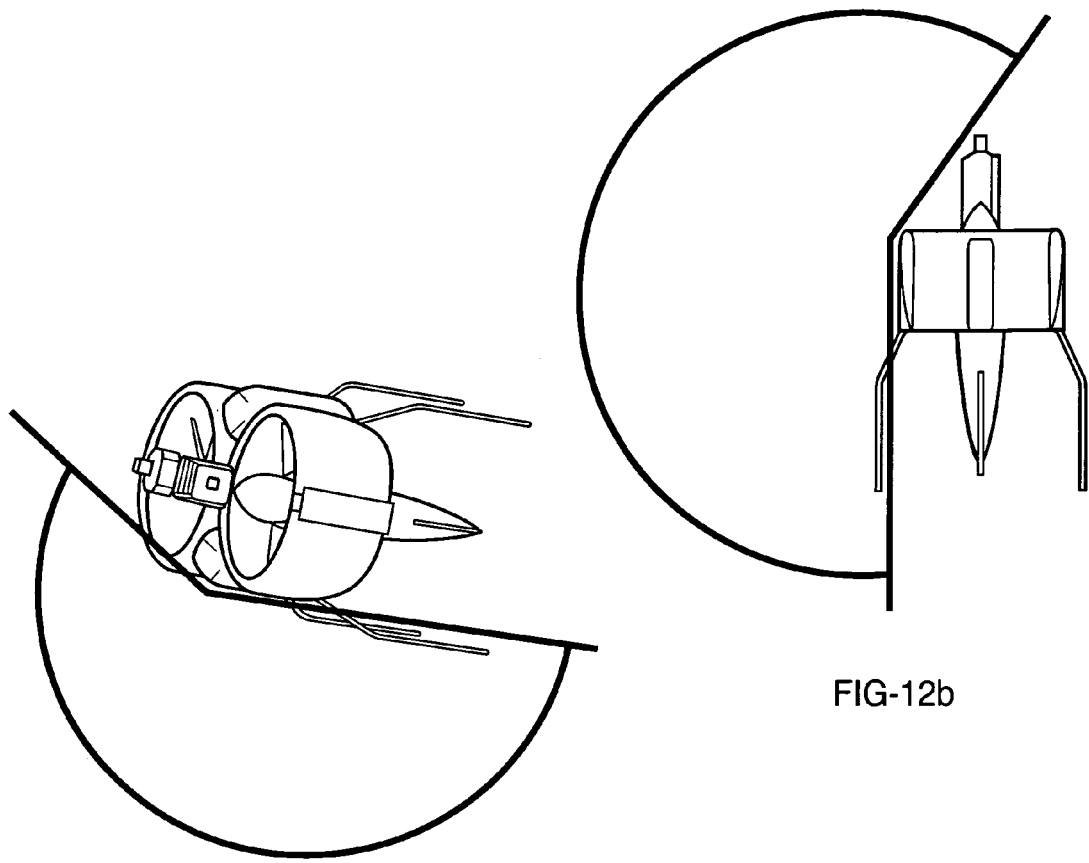
FIG-12b
FIG-12a
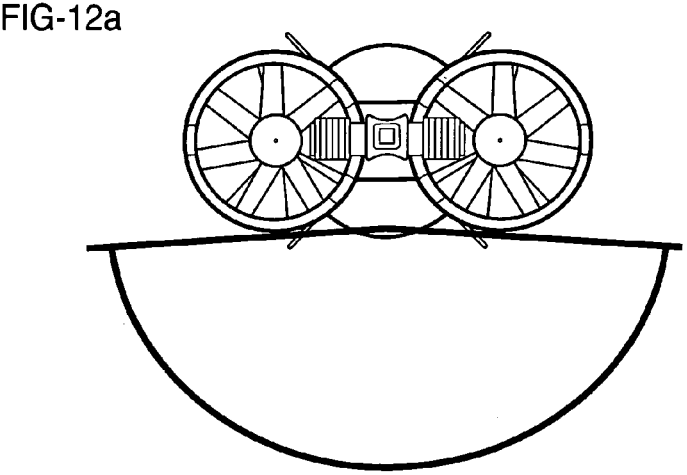
FIG-12c

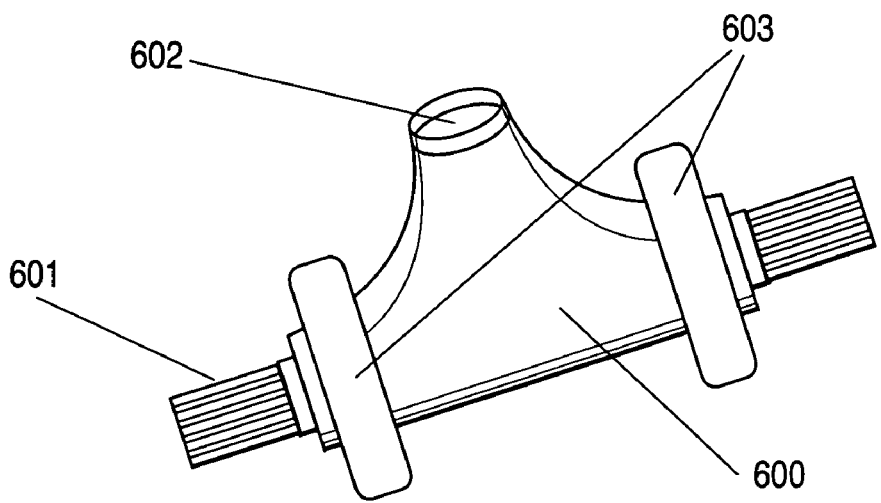
FIG-15
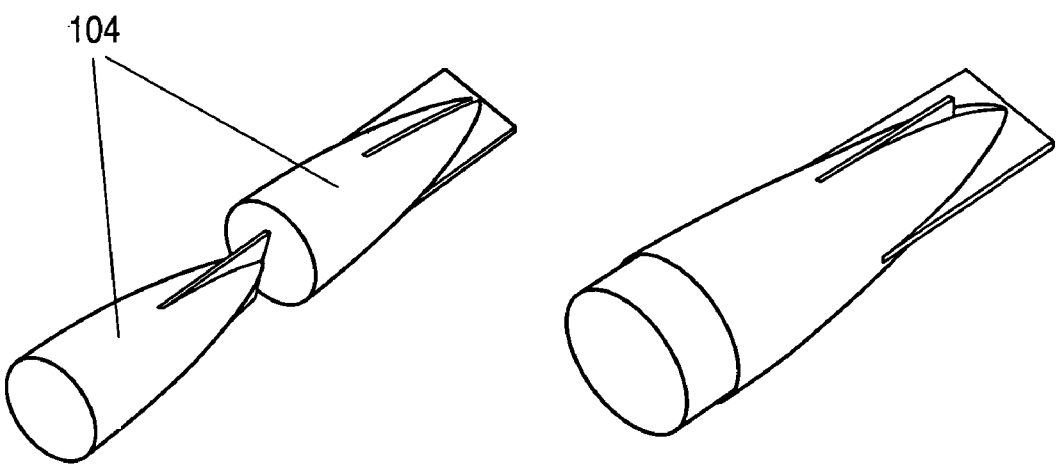
FIG-16a                    FIG-16b

DOUBLE DUCTED HOVERING AIR-VEHICLE

CROSS-REFERENCE TO RELATED APPLICATIONS

This application is based on U.S. Provisional Application Ser. No. 60/656,811 entitled "Double Ducted Hovering Air-Vehicle", filed on Feb. 25, 2005, the teachings of which are incorporated herein by reference.

STATEMENT REGARDING FEDERALLY SPONSORED RESEARCH OR DEVELOPMENT

This invention was made with Government support under Agreement No. MDA972-01-9-0018 awarded by the Defense Advanced Research Projects Agency (DARPA). The Government has certain rights in this invention.

BACKGROUND OF THE INVENTION

1. Field of the Invention (Technical Field)

The present invention relates generally to the field of hovering and vertical take off and landing vehicles. More specifically, the present invention relates to air-vehicles with ducted fans as the propulsion system.

2. Background Art

Ducted fan configurations are known for their superior aerodynamic performance over non-ducted fans and several implementations of ducted fan hovering air-vehicles have been developed and flown. However, most of these vehicles either utilized single duct configurations with the engine center mounted or utilized rotating ducts attached to a fuselage to for thrust vectoring.

Hovering vehicles utilizing a single ducted fan configuration have the engine mounted either in a puller or pusher arrangement in the inlet or exit of the duct flow. Engine mounting is to the duct ring. Stator assemblies are implemented just after the fan to remove the induced fan swirl to provide linear axial flow. Thrust vectoring is accomplished with sets of vanes in the resulting exit airflow. Avionics and payloads are either mounted inline with the engine (forward or aft of the fan/stator assembly) or as pods on the outside surface of the duct.

The problem is that the physics of the various parameters of; packing size weight and volume, endurance, acoustics, and fuel consumption all play against each other to make an optimum system that is humanly portable by the average soldier. The objective is to provide a vertical take off and landing and hovering vehicle with the greatest payload carrying capability and longest endurance and yet fit within the portable packing constraints of a soldier's equipment carrying system. This requires a critical balance of the vehicle payload, performance, endurance or persistence, propulsion system, control system, and weight, while minimizing acoustic signature.

The application of ducted fan propulsion to hovering air-vehicles has been attempted and successfully demonstrated in various configurations but successfully meeting all the needs for a deployable system requires a combination of utility and physics of the problem to be addressed. These hovering air-vehicles utilize well known physics of mass properties that generate thrust from moving air, that direct the air to control attitude, and axially linearize the air flow removing induced swirl for added thrust. Human back packing ability imposes additional weight, container constraint sizing constraints and plays against performance and set up times with a resulting reduced payload and endurance. Solutions that apply single ducted fans with inline engines exhibit reduced fan and duct efficiencies arising from engine, engine mount avionics, payload, and vane airflow disturbances. These single ducted fan solutions also suffer from increased aero-acoustic noise signatures because of these same airflow disturbances. The trailing attitude control vanes impact not only the acoustic noise signature but contribute to added drag and do nothing to counteract the natural outflow contraction ratio.

Managing the center of gravity along the duct axial direction and laterally across the duct is critical to making the vehicle controllable. Payload modularity is severely limited for axial locations with payloads of varying mass distributions as small shifts of the cg require control stabilization changes and can very quickly make the vehicle uncontrollable. Laterally located payloads are also often used but the mass properties require that there be a close to even balance between opposing masses relative to the axial axis of the fan. These vehicles are statically unstable and even though passive stability is desired it is not attained. Compounding the cg management problem is the electrical wiring between pods and control effectors. There are no convenient wire routing channels between payloads and avionics located around the exterior of the duct or axially above or below the engine. The compromises will usually impact weight, efficiency, and limit payload modularity.

Centrally mounted engines impact structural integrity of the payload pod mounting and the engine mount structure. Minimum gap between the fan blades and the duct is desired for greatest efficiency but is limited by the engine vibration and structural bending of the engine mound and duct. The duct attachment point is also a high structural failure point. Sensor integrity is compromised when blurred by vibration from payload pods mounted cantilevered around the duct and in front of or below the engine due to natural body bending modes. These effects add up to more exotic materials and weight to manage the undesirable effects.

Endurance and/or persistence of the vehicle mission are impacted with the limited fuel carrying capacities when the only location for fuel is limited to the interior of the duct.

Sensor visibility is severely restricted by either axially in-line or laterally duct mounted pods. Vehicle orientation in forward flight will obscure an axially down looking sensor mounted below the fan. Vehicle orientation in hover will obscure an axially mounted sensor above the engine. Laterally mounted side pod sensors have good visibility forward and down in hover and forward flight, but are limited to side viewing.

Structurally integrated systems that require close tolerances and layered assemblies limit the fielded utility of a potentially back packable system through increased setup and teardown times. Specialized tools may be required to remove assemblies and higher skill levels are required. Maintenance, repair, and replacement of components is limited because of the complexity associated with component assembly.

With all these issues previous solutions have focused only on individual elements of the problem or some combination of the problems but have failed to provide a solution that addresses the complete physics of a fieldable system. A system that combines the performance of larger duct sizes, enhances the duct aerodynamic efficiency, is inaudible to the human ear, supports a variety of payload sizes weights mass distributions and electrical interfaces, is reconfigureable for missions, provides high structural solidarity for maximum sensor utility, supports backpacking for human transport, and provides rapid setup tear down and maintenance actions is provided in this invention.

The following are prior art patents that disclose differing types of prior art inventions that are lacking the inventive concepts of the present invention. U.S. Pat. No. 6,691,949, entitled Vertical Takeoff and Landing Aerial Vehicle; U.S. Pat. No. 6,672,538, entitled Transmission for a Coaxial Counter Rotating Rotor System; U.S. Pat. No. 6,655,631, entitled Personal Hoverplane with Four Tiltmotor; U.S. Pat. No. 6,607,162, entitled Ring-Wing Aircraft; U.S. Pat. No. 6,270,038, entitled Unmanned Aerial Vehicle with Counter-Rotating Ducted Rotors and Shrouded Pusher-Prop; U.S. Pat. No. 6,170,778, entitled Method of Reducing a Nose-Up Pitching Moment on a Ducted Unmanned Aerial Vehicle; U.S. Pat. No. 6,065,718, entitled Universal VTOL Power and Rotor System Module; U.S. Pat. No. 5,941,478, entitled STOL/VTOL Free Wing Aircraft with Modular Wing and Tail; U.S. Pat. No. 5,890,441, entitled Horizontal and Vertical Take Off and Landing Unmanned Aerial Vehicle; U.S. Pat. No. 5,863,013 and U.S. Pat. No. 5,575,438, entitled Unmanned VTOL Ground Surveillance Vehicle; U.S. Pat. No. 5,419,513, entitled Ancillary Aerodynamic Structures for an Unmanned Aerial Vehicle Having Ducted, Coaxial Counter-Rotating Rotors; U.S. Pat. No. 5,407,150, entitled Thrust Unit for VTOL Aircraft; U.S. Pat. No. 5,372,337, entitled Unmanned Aerial Aircraft Having a Single Engine with Dual Jet Exhausts; U.S. Pat. No. 5,351,913, entitled Coaxial Transmission/Center Hub Subassembly for a Rotor Assembly Having Ducted, Coaxial Counter-Rotating Rotors; U.S. Pat. No. 5,277,380, entitled Toroidal Fuselage Structure for Unmanned Aerial Vehicles Having Ducted, Coaxial, Counter-Rotating Rotors; U.S. Pat. No. 5,226,350, entitled Drive Train Assembly for a Rotor Assembly Having Ducted, Coaxial Counter-Rotating Rotors; U.S. Pat. No. 5,150,857, entitled Shroud Geometry for Unmanned Aerial Vehicles; and U.S. Pat. No. 5,145,129, entitled Unmanned Boom/Canard Propeller V/STAL Aircraft.

SUMMARY OF THE INVENTION (DISCLOSURE OF THE INVENTION)

The combination of various aspects of the invention together provides a unique hovering air-vehicle configuration that addresses the complete physics of the problem.

This invention addresses both maximization of performance (measured in endurance or persistence, payload capacity, service ceiling, vertical rate of climb, and forward speeds) and minimization of acoustic signature (measured in dBA representative of human ear inaudibility). The major sources of inefficiency (common to acoustic noise sources) from duct wake inflow disturbances generated by in-line engine, engine mounts, vanes, and payloads has been eliminated with no structures in front of the fan and single axis tail cone vane attitude control. Counter rotating fans eliminate the requirement for out-flow linearization by stator assemblies. Attitude control from a single axis effector in each duct and relative fan speed reduces the out-flow disturbances that normally come from multi-axis control vanes. The tail cone structure reduces the natural contraction ratio. The number of attitude control vane servos is reduced from four to two but is balanced with two speed-braking servos.

The mechanical structure of the payloads between the two ducted fan assemblies forms a naturally rigid structure that reduces vibration to sensors. Duct efficiencies are increased through reduced fan tip clearances because the engine torques do not move the fan relative to the duct. The engine is shock mounted from the vehicle structure removing the major source of sensor vibration and fan movement relative to the duct.

The central location of the major mass increases the vehicle angular agility because of reduced inertial moments. Controllability with variations in payload total mass, mass distributions, and volume is enhanced by the central location of the lateral mass of the vehicle and the vertical control of the longitudinal mass of the vehicle. Vertical control of the center of gravity is managed through location of the dovetail pins on the payload shell. Mechanical payload modularity is achieved that provides freedom from impact to the propulsion system consisting of the duct/fan assemblies and the engine/differential.

Variants that use winglets are also configurable without impacting the propulsion system as they are attached and located in a similar manner to dovetail inserts on the two duct/fan assemblies. Duct/fan assemblies are identical structures. Fan design features are also identical but reversed for counter rotation.

The dovetailed connections between duct/fan assemblies and the payload pods facilitate quick assembly for use and quick disassembly for packing. Engine, transmission, and duct/fan assemblies are also quickly mated or separated with splined shaft and receptacles. The separable assemblies are quickly stackable in a cylinder for transport.

Individual components of the invention provide unique features in themselves contributing to a superior performing vehicle.

A primary object of the present invention is to provide a ducted fan Micro Air-Vehicle vehicle with the greatest payload carrying capability and the longest endurance and yet still fit within the portable packing constraints of a soldier's carrying system.

A primary advantage of the present invention is that it provides an increased lift performance for a ducted fan vehicle with transport container constraints supporting larger payloads.

Another advantage of the present invention is that it provides increased endurance from aerodynamic efficiencies and increased fuel loads for a ducted fan vehicle-in small transport container.

Another advantage of the present invention is that it provides a reduced aero-acoustic signature through elimination of inflow disturbance sources from no engine or engine mount in front of the fan.

Another advantage of the present invention is that it provides for quick assembly/disassembly through use of splined shafts and dove-tail structural connections.

Another advantage of the present invention is that it provides structural solidarity over cantilevered pods.

Another advantage of the present invention is that the tail cones reduce the contraction ratio as well as provide passive stability.

Another advantage of the present invention is that it enables engine vibration isolation from the structure and therefore enables tighter fan tip to duct clearance and removes the major source of sensor noise.

Another advantage of the present invention is the vertical center of gravity management method enabling payload variability and active payload emplacement.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIGS. 12a, 12b and 12c illustrate the payload sensor visibility.

FIG. 15 illustrates the preferred differential assembly.

FIGS. 16a and 16b show the preferred method for stacking the tail cones.

DESCRIPTION OF THE PREFERRED EMBODIMENTS (BEST MODES FOR CARRYING OUT THE INVENTION)

Aspects of the present invention provide a system and method for construction of a double-ducted hovering air-vehicle. In the carrying of payloads the present invention has enhanced aerodynamic and acoustic performance. It also provides payload and transport packing flexibility.

Although the following disclosure will make reference to a double ducted hovering air-vehicle it should be appreciated that the present invention may have a broader applicability in the field of air-borne vehicles. Particular configurations discussed in examples can be varied and are merely cited to illustrate an embodiment of the present invention and are not intended to limit the scope of the invention.

Figure 1:
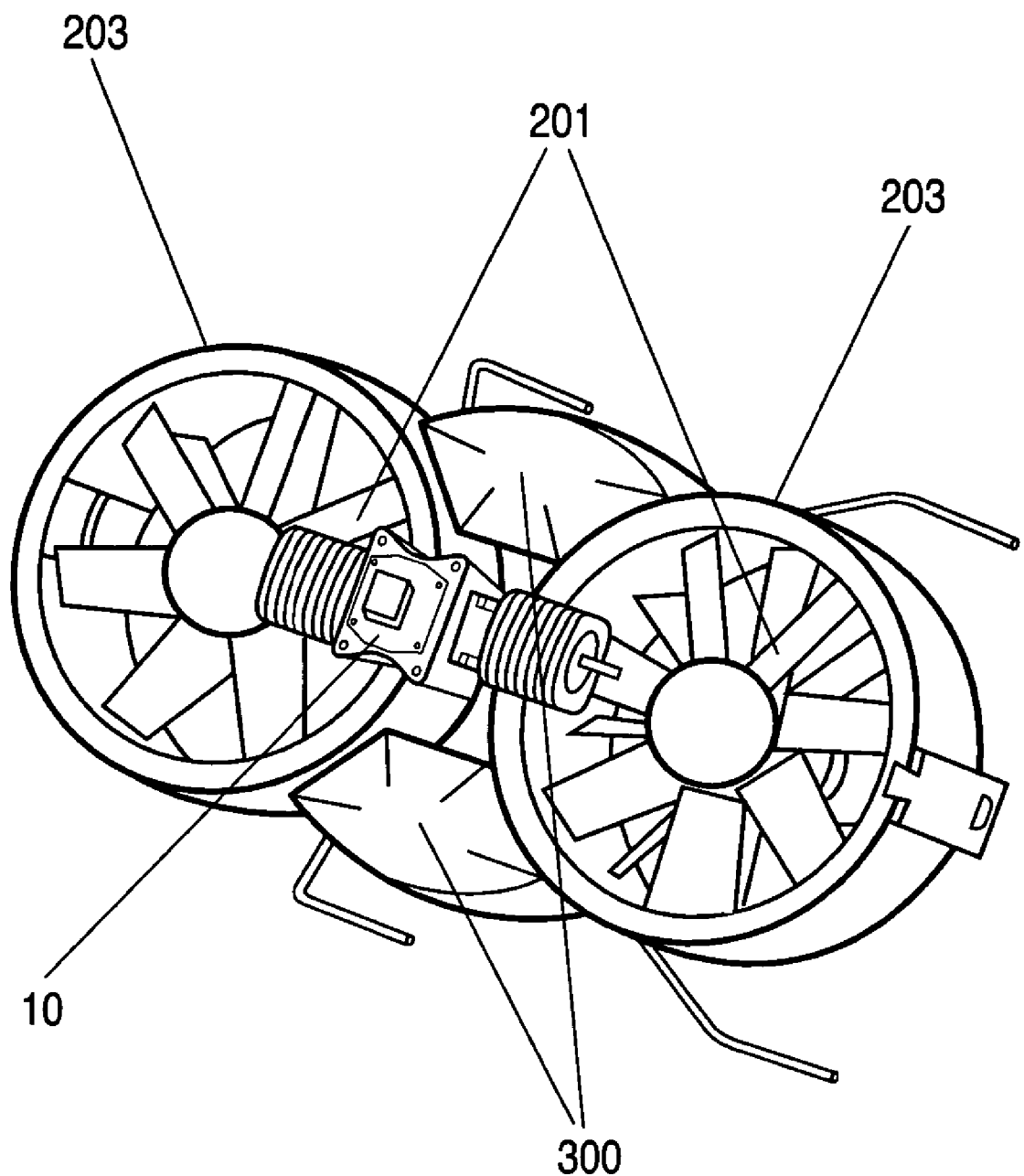
FIG. 1 is a three dimensional isometric front view or the preferred embodiment of the invention.
Figure 2:
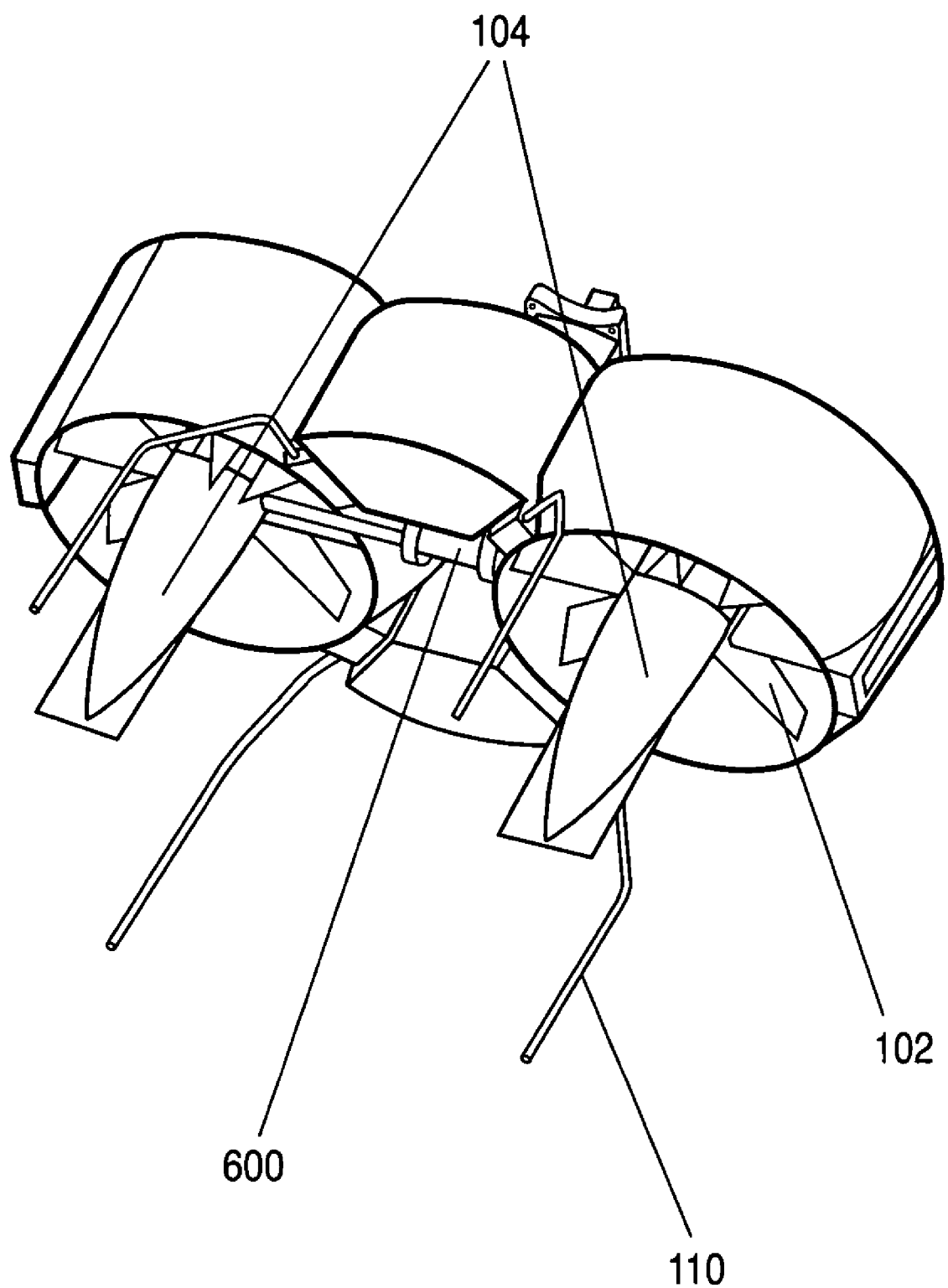
FIG. 2 is a three-dimensional isometric rear view of the embodiment of FIG. 1.

Referring to FIG. 1 and FIG. 2, the present invention teaches the construction of a double-ducted air-vehicle assembly consisting of two ducted fan assemblies 203, two avionics/payload pods 300, a reciprocating or turbine engine 10, a differential 600, tail cones 104, and landing gear 110.

FIG. 1 shows a front view of the preferred invention and FIG. 2 shows a rear view of the embodiment of FIG. 1. The only components in the direct airflow path are fans 201, stator 102, and tail cones 104. Potential airflow disturbances from engine 10, payload pods 300, and control effectors normally in front and following fan and stator elements are located in the center between the two ducted fan assemblies 203 thus increasing the ducted fan efficiency and at the same time reducing acoustic noise.

Figure 3:
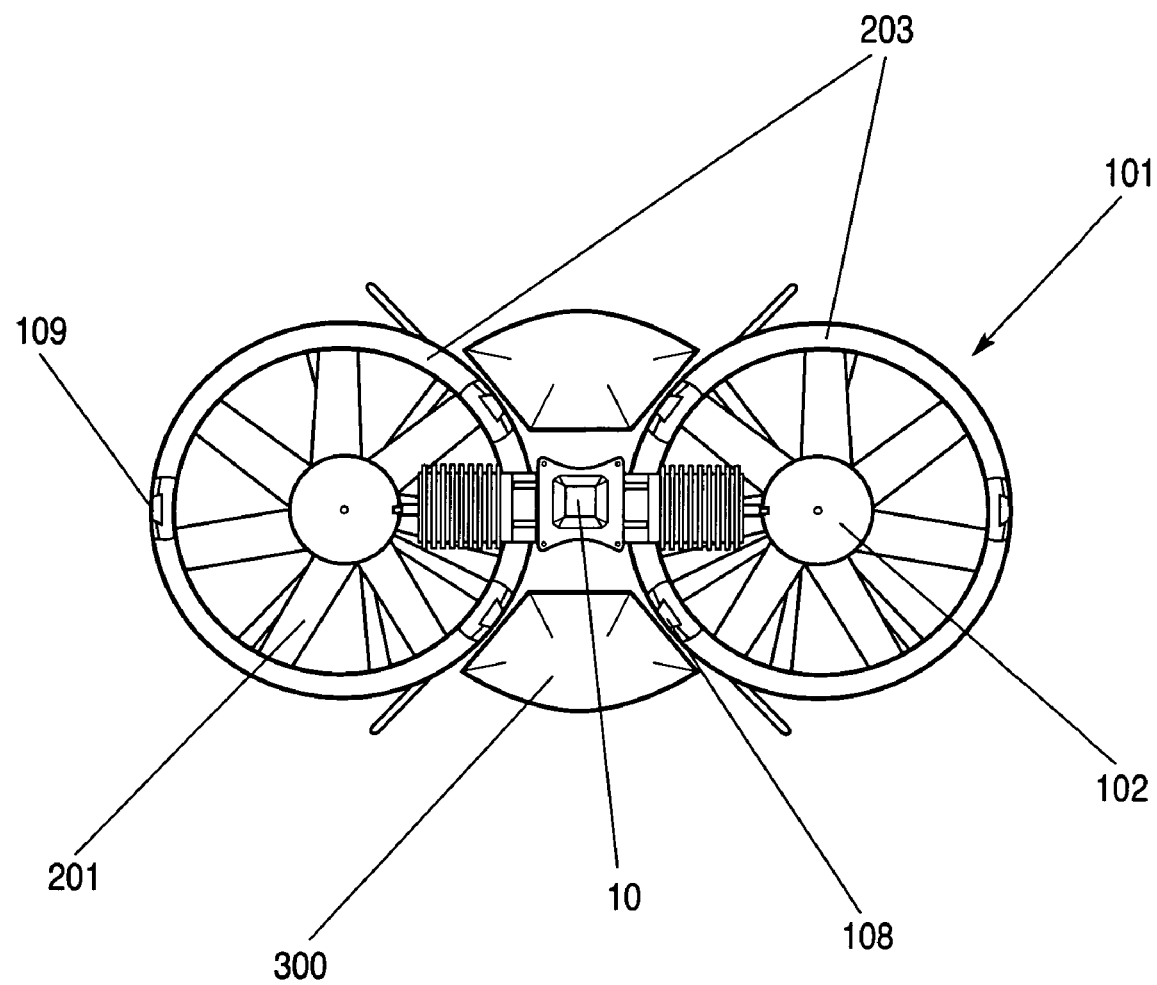
FIG. 3 is a front view of the embodiment of FIG. 1 showing some of the components.

Referring to FIG. 3, the two duct/fan assemblies 203 are identical in the duct 101 spinner 102, tail cone 104, fuel bladder 106 (located in the upper lip of the duct 101), and dovetail assembly mechanism 108 structures. Counter rotating fan 201, stator fan mount 102, and counter rotating drive gear 202 differ between the duct assemblies only in that they are reversed for counter rotation. Each duct 101 has identically located dovetail assembly mechanism 108 for pod attachments and variant winglet/pod attachment points 109. Further dovetail assembly mechanisms can be located on the ducts for attachments of other optional equipment such as lights or other payload pods (not shown). Two identical dual pods 300 are shown attached to the ducted fan assembly 203 through the dovetail assembly mechanisms 108. The vehicle is powered by an engine 10 such as a reciprocating or turbine engine centrally located on the air vehicle as the power unit 10. In an alternative embodiment, each of the duct fan assemblies can be powered by a separate engine or electric motor. Energy transfer from the engine 10 to the fans is through an energy transfer apparatus such as a differential 600, as shown in FIG. 2. One of the pods 300 contains the vehicle control avionics, vehicle control system sensors, and potentially a fuel bladder. The other pod may contain sensors, additional fuel, or an object to be dropped or emplaced.

Figure 4:
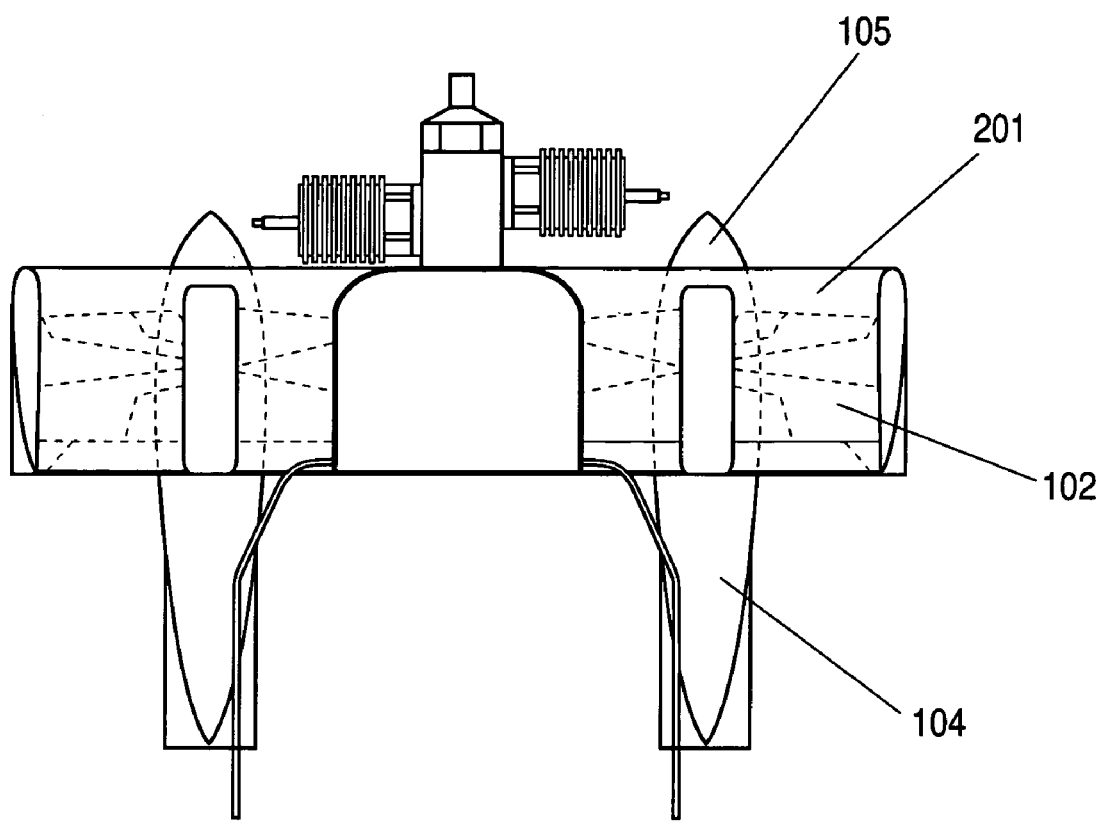
FIG. 4 is a side view of the embodiment of FIG. 3.
Figure 5:
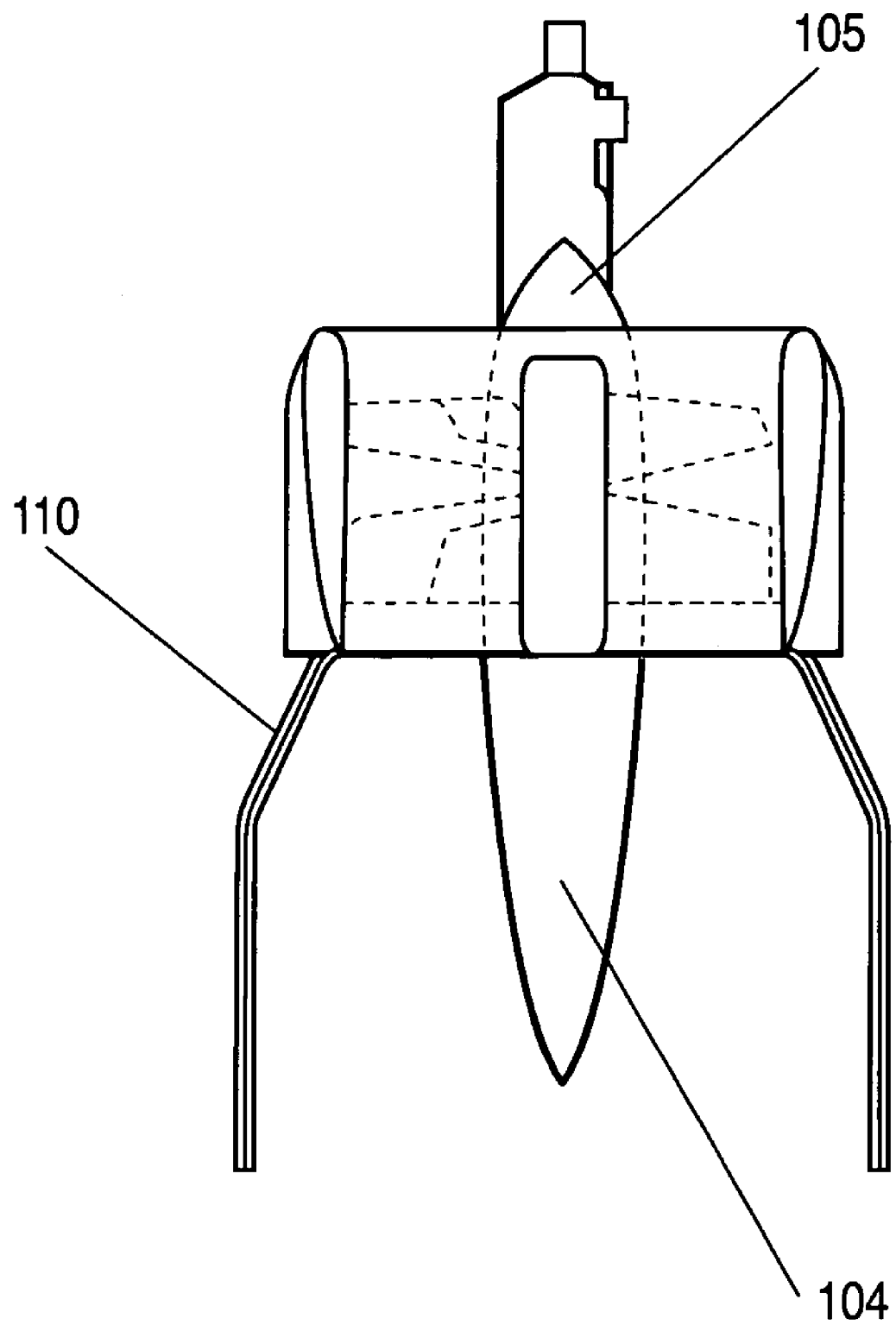
FIG. 5 is a three-dimensional narrow side view of the embodiment of FIG. 3.

Referring to FIG. 4, fan 201 and stator/fan mount 102 are shown viewing them through a semi-transparent duct. Each fan assembly 203 is similarly constructed. Stator 102 provides the structural mounting for fan 201 and tail cone 104 as well as linearizes airflow. Spinner 105 is located on top of fan 201 for airflow smoothing. Tail cone 104 minimizes exit airflow contraction improving thrust. FIG. 5 shows a side view with the spinner 105 and tail cone 104 and landing gear 110. Landing gear 110 is shown attached to duct dovetail assembly mechanisms 108 for greatest structural strength. Although dovetail attachment assembly 108 is described, this disclosure is not meant to limit the attachment method. Any other well known method of attachment can be used.

Figure 6A:
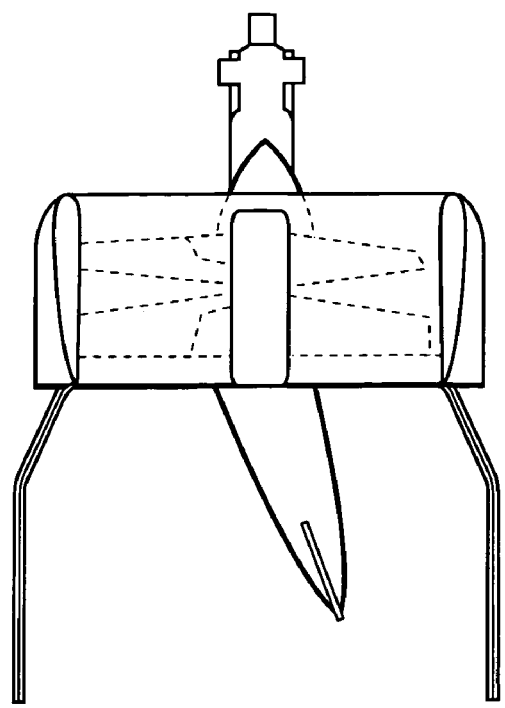
FIGS. 6a and 6b show how the tail cone provides pitch control.
Figure 6B:
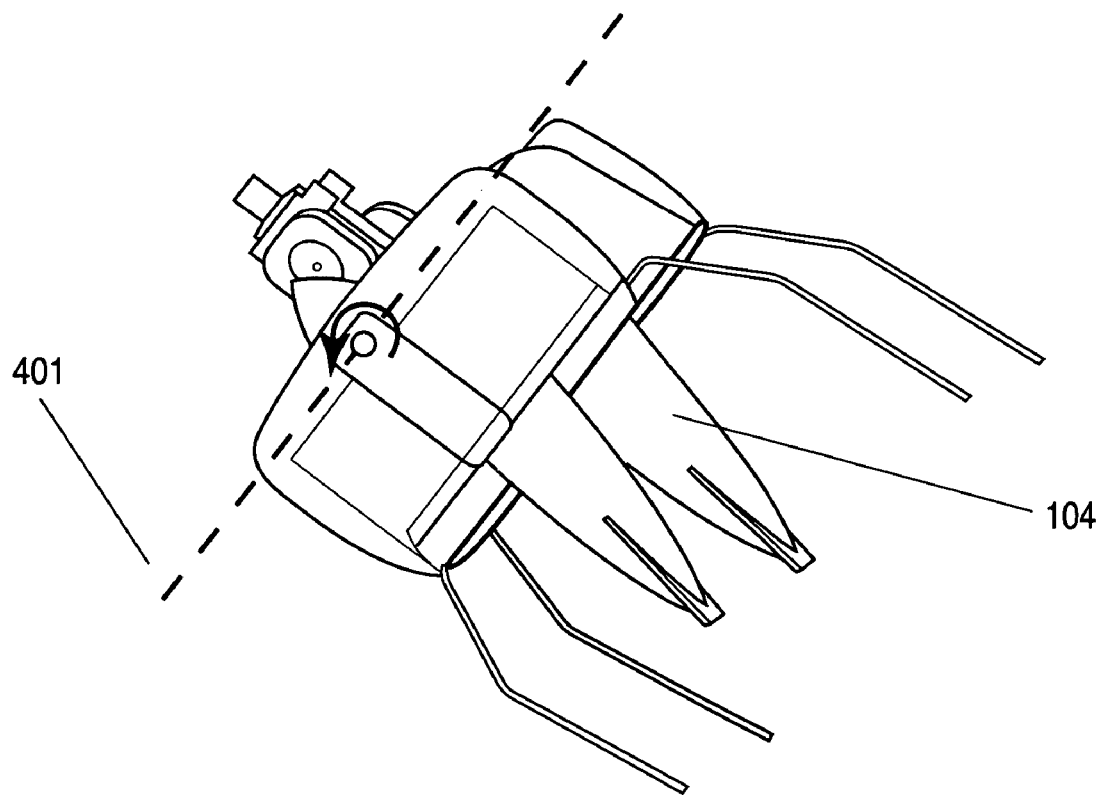

FIG. 6 illustrates the means of pitch axis control by which the vehicle is rotated about the pitch axis 401. The pitch axis 401 passes through the center of both ducts 101 and is located towards the duct upper lips. Pitch moments are provided by common deflection of the two tail cones 104 in the same orientation. The tail cones 104 only require one axis of freedom, the pitch axis 401 in order to provide both pitch and yaw control.

Figure 7A:
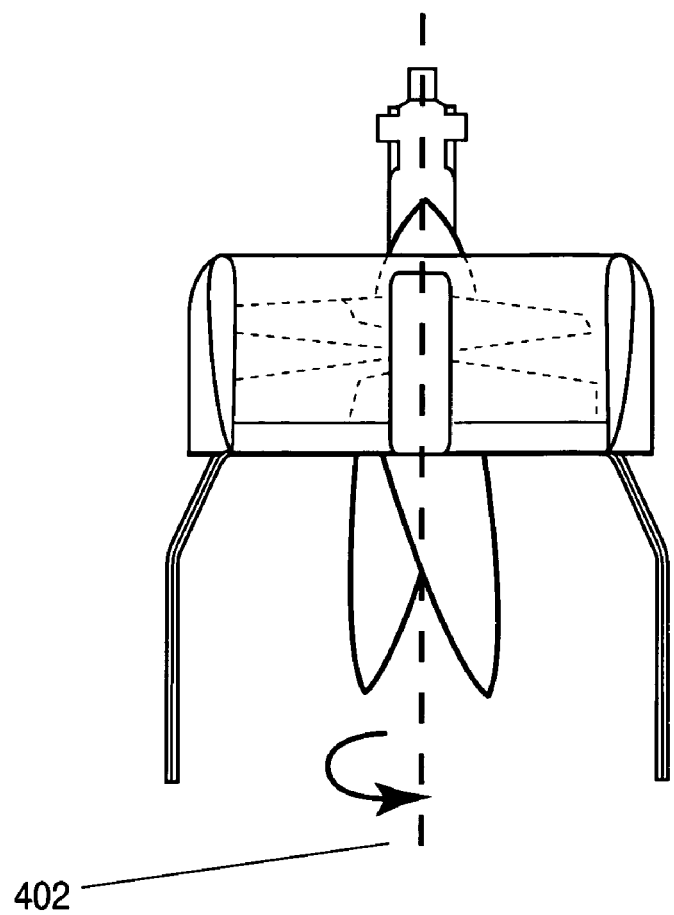
FIGS. 7a and 7b show how the tail cone provides yaw control.
Figure 7B:
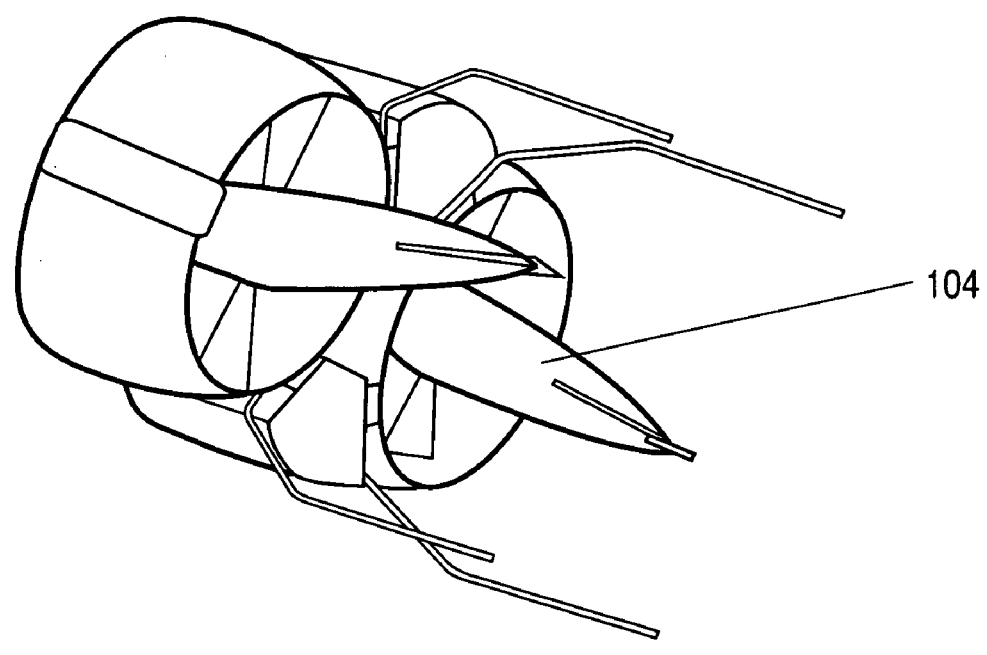

FIG. 7 illustrates the means of yaw axis control for rotating the vehicle about yaw axis 402. Yaw axis 402 passes through the center of engine 10 in the vehicles longitudinal direction between two ducts 101. Yaw moments are generated by opposing deflection of flowing air deflected by two tail cones 104, as shown.

Figure 8:
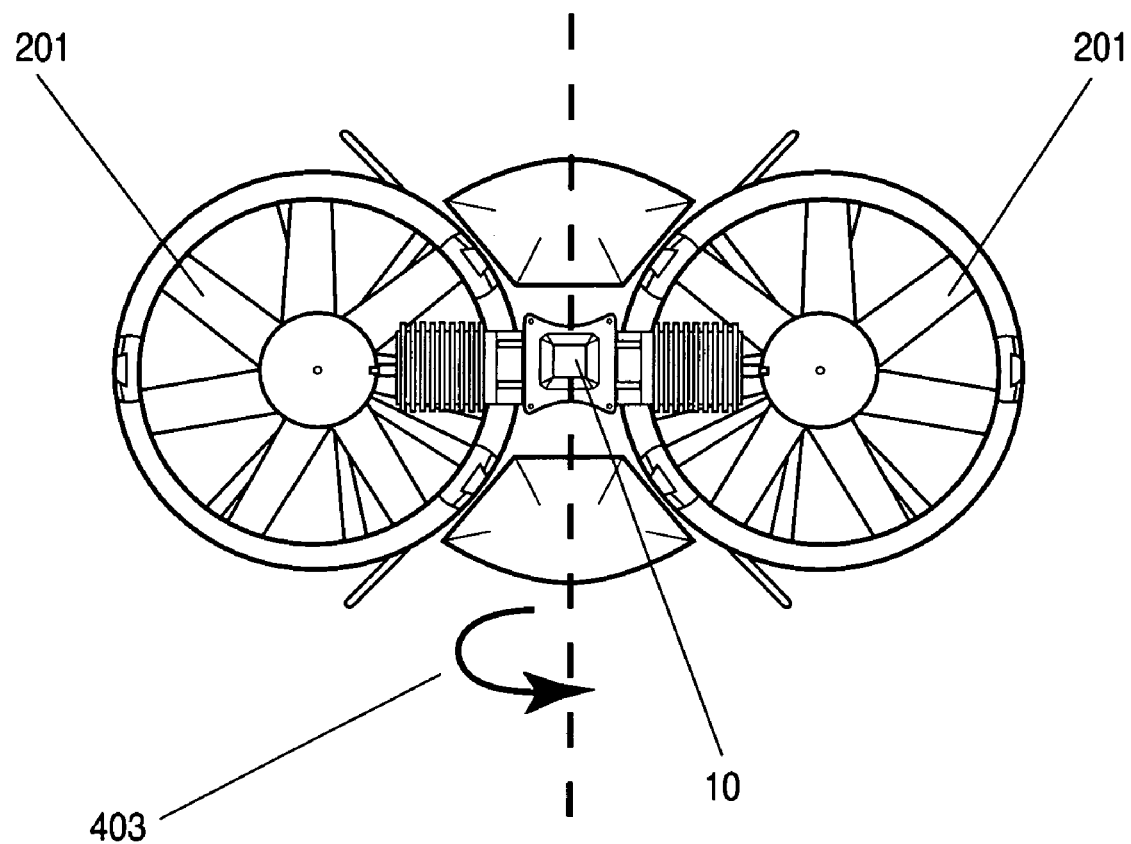
FIG. 8 shows roll axis control through relative fan speed.
Figure 9A:
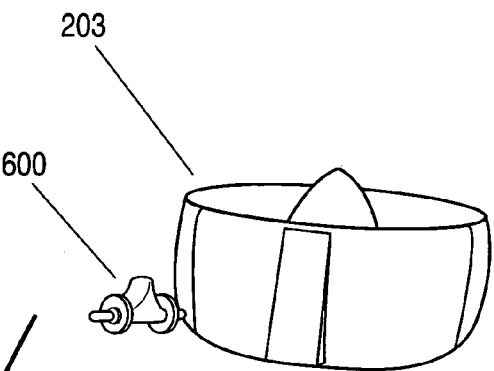
FIGS. 9a through f illustrate the preferred assembly sequence.
Figure 9F:
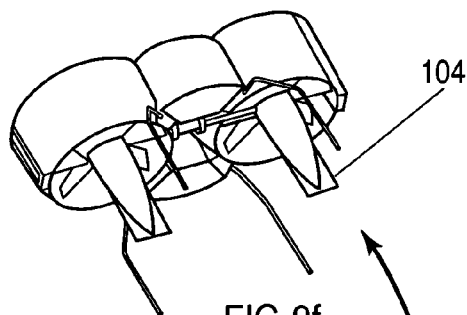
Figure 9B:
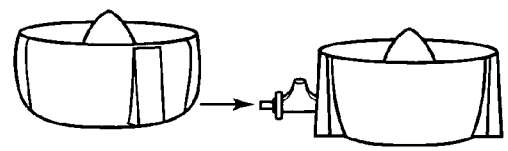
Figure 9E:
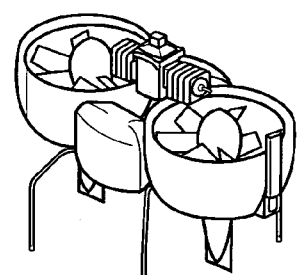
Figure 9C:
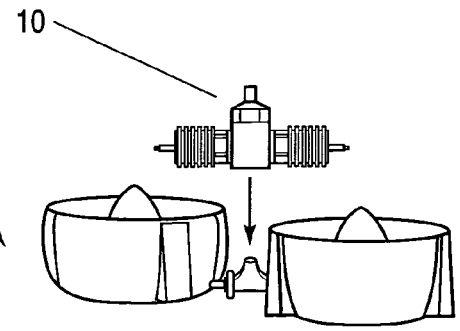
Figure 9D:
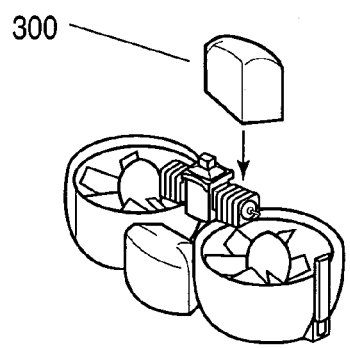

FIG. 8 illustrates the means of roll axis control for rotating the vehicle about roll axis 403. Roll axis 403 passes through the center of engine 10 in the vehicles lateral direction between two ducts 101. Managing the relative fan speeds through the differential speed brakes 603 of FIG. 15, generates roll moments.

The combination of pitch control, FIG. 6, yaw control, FIG. 7, and roll control, FIG. 8, provides complete attitude control of the vehicle. Altitude is managed with total ducted fan thrust, determined by fan speed, but relative thrust, determined by relative fan speeds develops roll moments. Relative orientation or combined orientation of the tail cones 104 controls the vehicle attitude in pitch and yaw through thrust vectoring. These tail cones only rotate in one axis therefore only require one servo drive. Pitch, yaw, roll, and thrust control are managed by a stability control system common knowledge to those skilled in the art.

FIG. 9 illustrates the air-vehicle assembly sequence for a soldier's equipment carrying system. The differential 600 spline 601 of FIG. 15 is inserted into one of the ducted fan assembly 203 spline sockets. The second ducted fan assembly 203 spline socket is slid over the other spline 601 of FIG. 15 of the differential 600. Then the engine splined shaft is slid into the differential 600 splined coupling 602 of FIG. 15. The dual pods 300 are then attached to the two ducted fan assemblies 203 by sliding the pod downwards through the duct dovetail assembly mechanisms 108. Then landing gear 110 are attached followed by the two tail cones 104, as shown.

Figure 10:
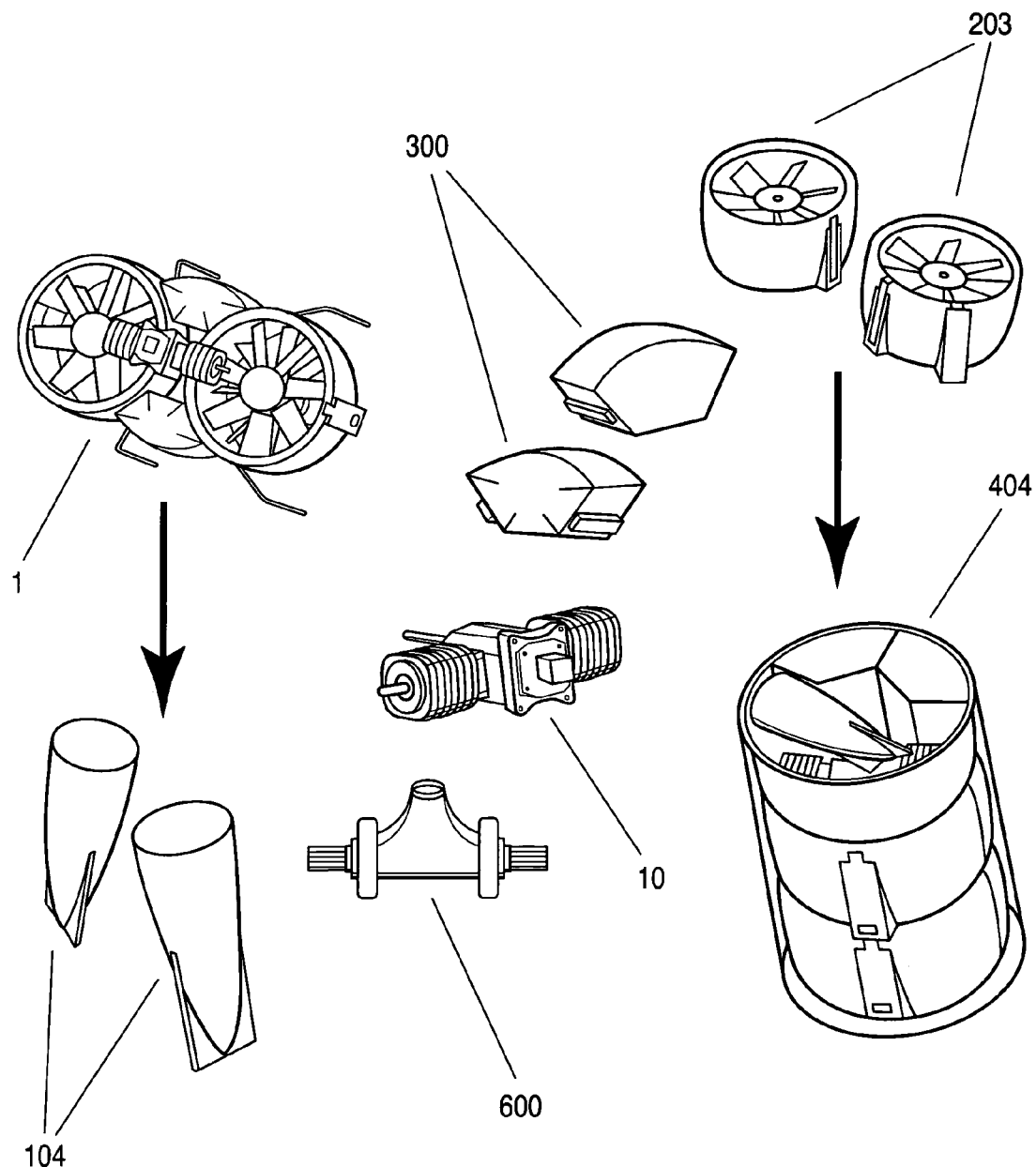
FIG. 10 illustrates the preferred transport packing sequence.

FIG. 10 illustrates the disassembly and packing sequence for the preferred double-ducted hovering air-vehicle as described above. First the tail cones 104 and then the landing gear 110 are removed from the assembled vehicle 1. The power unit 10 and differential 600 are removed and then the dual pods 300 are pulled from the duct dovetail assembly mechanisms 108. With the disassembly complete, the two ducted fan assemblies 203 are inserted into the bottom of the packed transport container 404. The two dual pods 300 are laid on top of the top ducted fan assembly 203 in a circular pattern next to the packed transport container 404 inner circle. The power unit 10 and differential 600 are put in remaining space. One of the tail cones 104 is inserted into the other at a ninety (90) degree orientation and laid on top of the power unit 10, as shown.

Figure 11A:
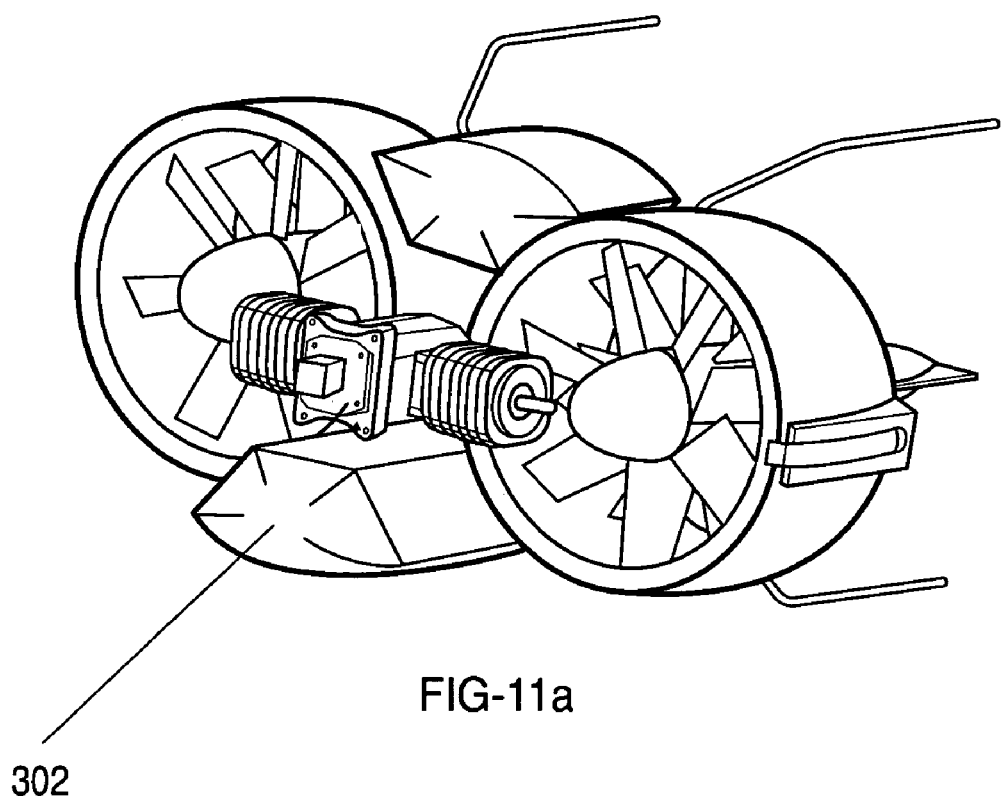
FIGS. 11a and 11b illustrate the alternative large pod.
Figure 11B:
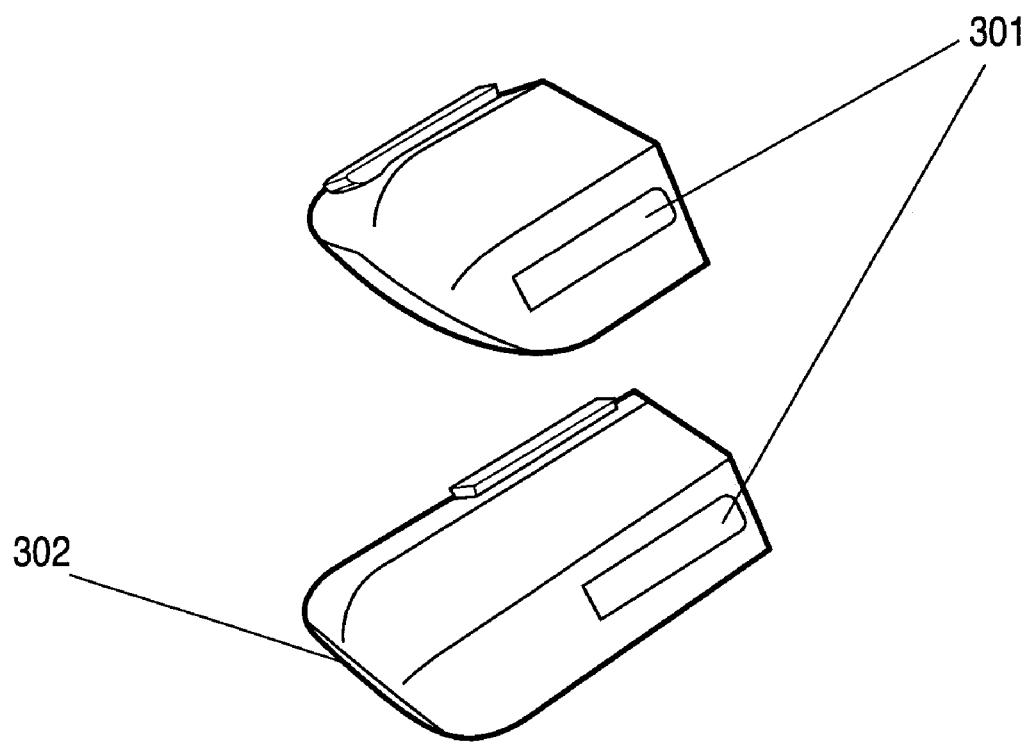

FIGS. 11a and 11b illustrate a variant of the assembled air-vehicle 1 where the forward payload pod 302 is enlarged for greater volume and weight capacity. The center of gravity location relative to the leading edge lip of the duct is maintained by the location of the duct dovetail assembly mechanism 108 and the payload dovetail assembly mechanism 301. As shown in the illustration the large pod variant 302 has the payload dovetail assembly mechanism 301 located towards the bottom of the payload shell.

FIGS. 12a, 12b and 12c illustrate the payload sensor visibility. The payload sensor visibility is one hundred and eighty (180) degrees or greater in forward flight payload sensor visibility (FIG. 12a), forward and rear payload sensor visibility (FIG. 12b), and horizontal payload sensor visibility (FIG. 12c).

Figure 13:
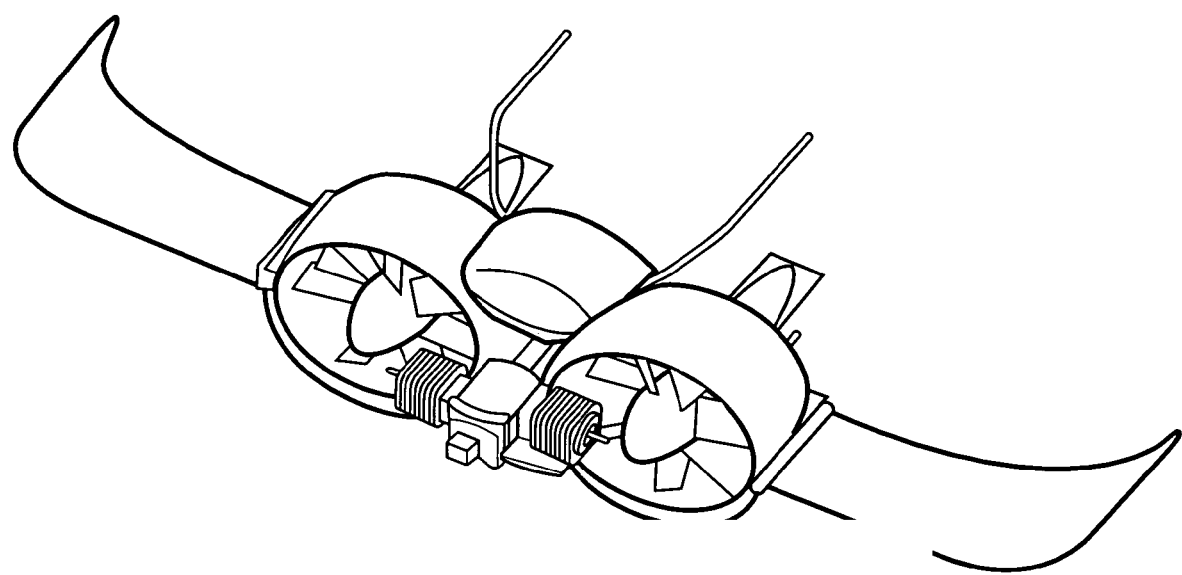
FIG. 13 illustrates an alternative configuration of the assembled air-vehicle with winglets.

FIG. 13 illustrates an alternative configuration of the assembled air-vehicle 1 with attached winglets 500. Winglets 500 are provided to improve the flight times and maneuverability of assembled air vehicle 1. These outer dovetail assembly mechanism points 108 can be used to attach other functions such as sensors, lights, etc.

Figure 14:
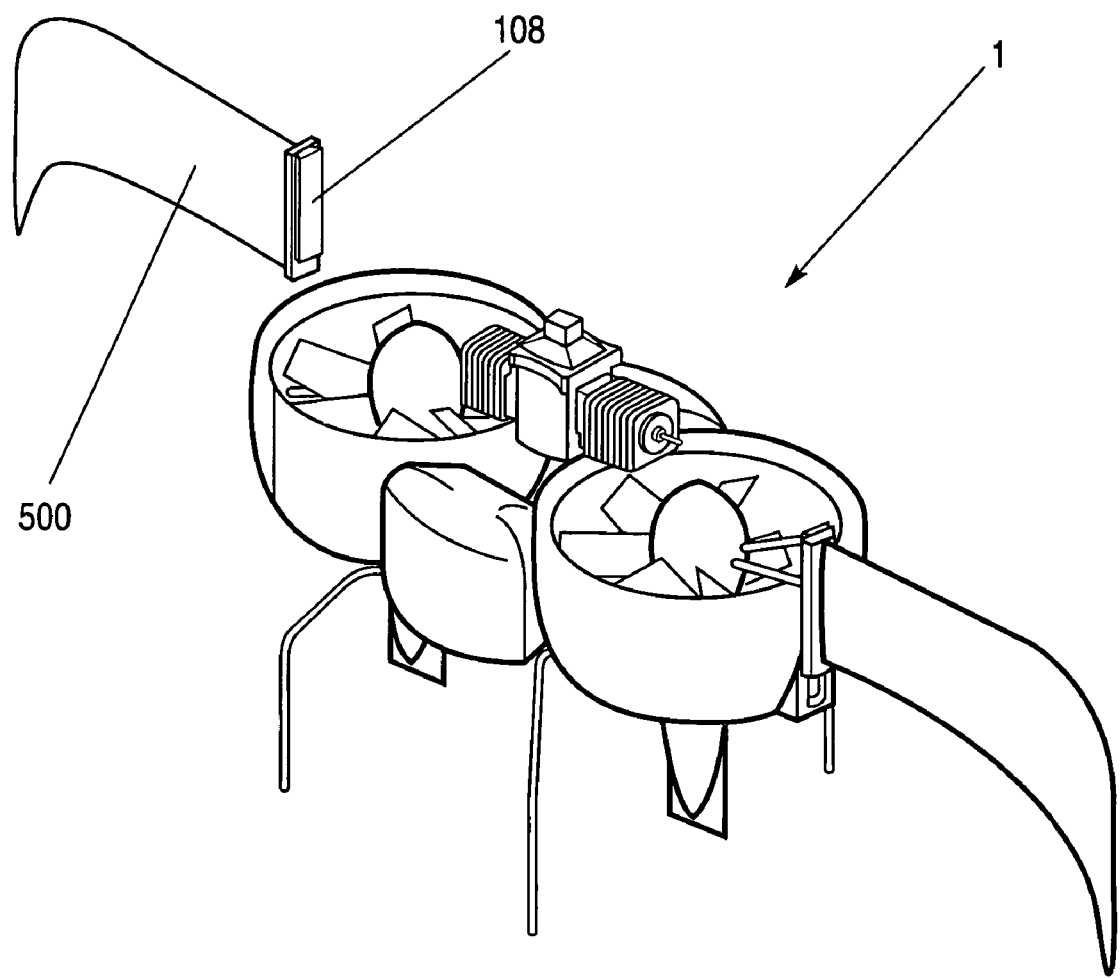
FIG. 14 illustrates the assembly process for attaching removable winglets to the assembled vehicle.

FIG. 14 illustrates the assembly process for attaching removable winglets 500 to the assembled vehicle 1. Similar to the payload pod attachment the winglets are attached to a duct dovetail assembly mechanism 108 located on the outer edges of the two ducted fan assemblies 203.

FIG. 15 illustrates the differential assembly. Power is provided into the differential 600 from the power unit 10 through the splined coupling 602. The differential 600 transfers this power to the ducted fan assemblies 203 through two splined shafts 601. The relative speeds of the output shafts are controlled through individually applying braking forces to the splined shaft 601 by the speed brakes 603 or via a shaft loading system. Speed brakes 603 can be either frictional or electric generators with variable load controls. The splined coupling 602 and the splined shafts 601 are tapered and fit onto the power unit 10 and to the ducted fan assemblies 203 for rapid assembly and disassembly.

FIGS. 16a and 16b illustrate the configuration of the tail cones 104 that supports stacking for compact transport. The tail cones 104 are hollow allowing insertion, one into another. Rotated ninety (90) degrees to the single axis vanes, are slots in the cones that allow the vanes to protrude when inserted.

Figure 17:
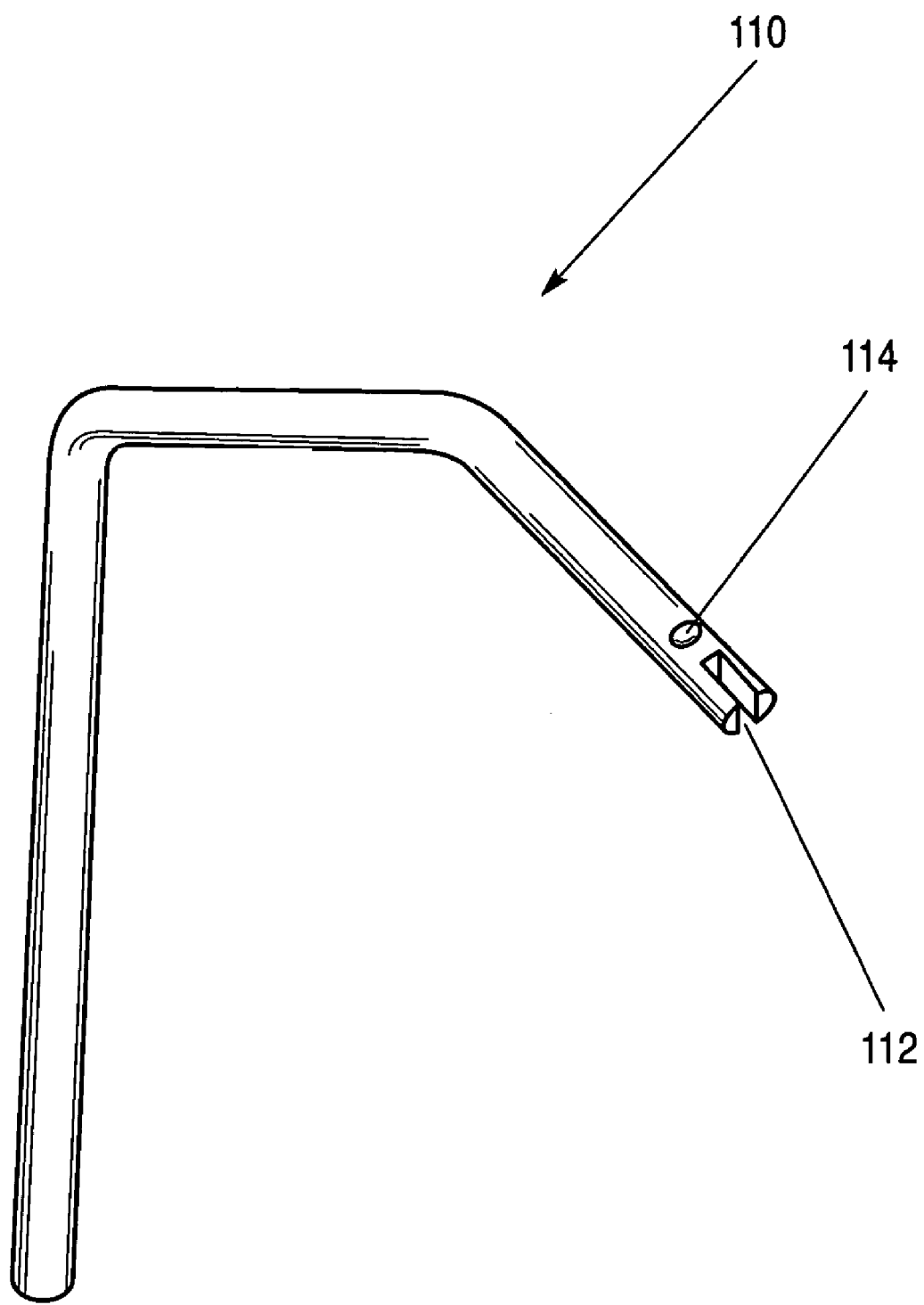
FIG. 17 illustrates the preferred landing gear structure.

FIG. 17 illustrates the landing gear 110 structure. They are shaped rods with slotted ends and a spring loaded ball, FIG. 17, that is inserted into a hole in the dovetail assembly mechanisms 108. The slotted end meshes with a rod in the dovetail assembly mechanism 108 hole to keep the legs from rotating.

Figure 18:
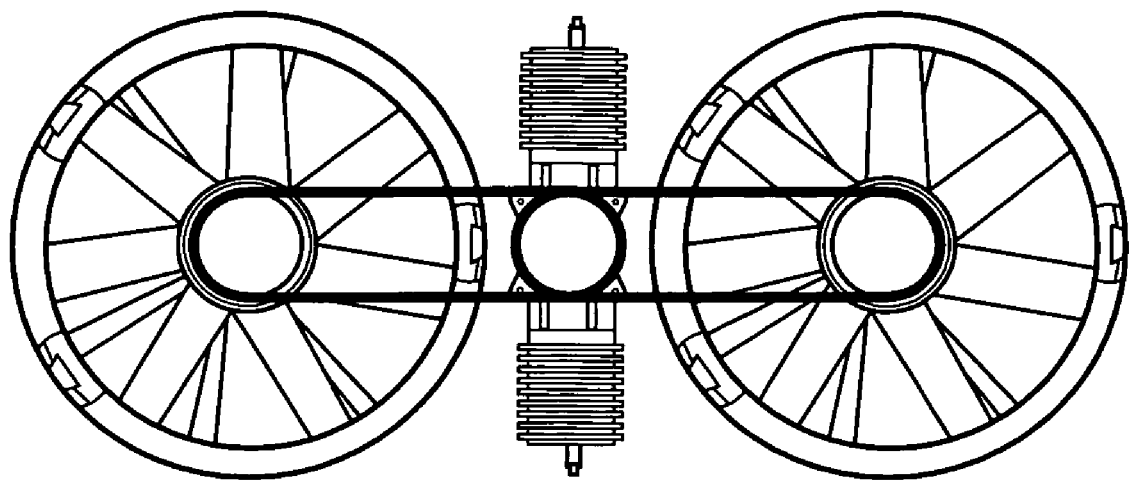
FIG. 18 illustrates an alternative drive system in which the energy is transmitted to the fans from the engine with a belt or chain system.

FIG. 18 illustrates an alternative drive system in which the energy is transmitted to the fans from the engine with a belt or chain system. Another solution would have no mechanical connections to the fans 201, rather an electric motor under each fan 201 with an electronic speed control.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A hovering air vehicle comprising:
   two duct fan assemblies comprising a rotating first fan in a first fan assembly and a second counter rotating fan in a second fan assembly;
   at least one engine for powering the first fan and said second fan, wherein the at least one engine is disposed outside of a duct inflow wave between the first fan assembly and the second fan assembly;
   an energy transfer apparatus for independently regulating a speed of the first fan and the second fan;
   at least two pods, a first pod from the at least two pods directly affixed to the first ducted fan assembly and the second duct fan assembly, and a second pod from the at least two pods directly affixed to the first duct fan assembly and the second duct fan assembly, the at least two pods being located between the two duct fan assemblies so as to maintain the center of gravity in the center of the ducts, and the at least two pods further comprising assemblies for removably affixing the at least two pods to the first and second duct fan assemblies and adjusting a lateral location of the at least two pods;
   a one axis of freedom tail cone for each duct fan assembly for both pitch and yaw attitude control of the hovering air vehicle; and
   a controller for independently controlling each tail cone position.

2. The air vehicle of claim 1 wherein said energy transfer apparatus comprises a controller for driving electric motors under the first fan and the second fan.

3. The air vehicle of claim 1 wherein the at least two assemblies for removably affixing the at least two pods comprise dovetail assemblies.

4. The air vehicle of claim 1 wherein the first and second pods comprise a member from the group consisting of avionics equipment, vehicle control system sensors, payload sensors, a payload and fuel.

5. The air vehicle of claim 1 wherein said at least two pods are affixed to the two duct fan assemblies to optimize payload sensor visibility.

6. The air vehicle of claim 1 comprising a plurality of dovetail assemblies for removably affixing winglets, lights or other payload pods.

7. The air vehicle of claim 1 wherein said two duct fan assemblies, said at least one engine and said energy transfer apparatus are each modular for quick assembly and disassembly.

8. The air vehicle of claim 1 wherein said two duct fan assemblies, said at least one engine and said energy transfer apparatus are configured to be stacked in a backpack.

9. The air vehicle of claim 1 wherein said at least one engine comprises a shock mount to said first fan assembly and said second fan assembly.

10. The air vehicle of claim 1 wherein said energy transfer apparatus comprises a differential.

11. The air vehicle of claim 10 wherein said differential comprises output shaft speeds that are independently controlled by a braking or a shaft loading system.

12. The air vehicle of claim 1 further comprising a landing gear.

13. The air vehicle of claim 12 wherein said landing gear comprises a slot and snapping structure for removably affixing said landing gear to the air vehicle.

14. A method for assembling a modular dual ducted air vehicle, the method comprising:
   a. inserting a first spline of an energy transfer apparatus into a first ducted fan assembly spline socket of a first fan assembly comprising a rotating first fan and inserting a second spline of the energy transfer apparatus into a second ducted fan assembly spline socket of a second fan assembly comprising a second counter rotating fan, wherein the energy transfer apparatus independently regulates a speed of the first rotating fan and the second counter rotating fan;
   b. affixing an engine splined shaft of an engine into a differential splined coupling, wherein the engine powers the first rotating fan and the second counter rotating fan and is disposed outside of a duct inflow wave between the first fan assembly and the second fan assembly;
   c. concurrently sliding a first end of a first pod into a first dovetail assembly on the first fan assembly and a second end of the first pod onto a second dovetail assembly on the second fan assembly;
   d. repeating step c) for a second pod, wherein the first and second pods are located between the first and second fan assemblies so a to maintain the center of gravity in the center of ducts of the first and second fan assemblies, the first and second pods further comprising assemblies for removably affixing the first and second pods to the first and second fan assemblies and adjusting a lateral location of the first and second pods; and
   e. attaching a first tail cone to the first ducted fan assembly and attaching a second tail cone to the second ducted fan assembly, wherein the first and second tail cones each have one axis of freedom for both pitch and yaw attitude control of the hovering air vehicle, and the first and second tail cones are independently controlled by a controller.

15. The method of claim 14 further comprising the step of sliding each leg from a plurality of landing legs onto a dovetail assembly slotted hole.

* * * * *

UNITED STATES PATENT AND TRADEMARK OFFICE
CERTIFICATE OF CORRECTION

PATENT NO. : 7,658,346 B2  Page 1 of 1
APPLICATION NO. : 11/338558
DATED : February 9, 2010
INVENTOR(S) : Emray R. Goossen It is certified that error appears in the above-identified patent and that said Letters Patent is hereby corrected as shown below:

Column 10, Claim 14, line 18, --assemblies so a to maintain-- should be --assemblies so as to maintain--

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,658,346 B2
APPLICATION NO. : 11/338558
DATED : February 9, 2010
INVENTOR(S) : Emray R. Goossen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Twenty-eighth Day of December, 2010

David J. Kappos
*Director of the United States Patent and Trademark Office*